US005895183A

United States Patent [19]
McDaniel et al.

[11] Patent Number: 5,895,183
[45] Date of Patent: Apr. 20, 1999

[54] CIRCULAR HOLE CUTTER

[76] Inventors: Jamie McDaniel, 2328 S. White Oak, Wichita, Kans. 67207; David Anderson, 4262 N. Westlake Dr., Wichita, Kans. 67220

[21] Appl. No.: 08/824,200

[22] Filed: Mar. 25, 1997

[51] Int. Cl.⁶ ..................................... B23C 1/20
[52] U.S. Cl. .................. 409/179; 30/300; 30/310; 83/745; 408/79; 408/115 R; 409/185
[58] Field of Search ............... 30/300, 310; 83/591, 83/596, 663, 745; 408/79, 88, 115 R; 409/178, 179, 181, 182, 185; 29/26 B

[56] References Cited

U.S. PATENT DOCUMENTS

| | | | |
|---|---|---|---|
| 2,134,069 | 10/1938 | Zimmerman | 30/300 |
| 2,943,392 | 7/1960 | Attridge | 30/310 |
| 3,124,182 | 3/1964 | Silken | 30/310 |
| 3,146,675 | 9/1964 | Anderson | 409/179 |
| 3,276,326 | 10/1966 | Gibbons et al. | 409/179 |
| 4,044,464 | 8/1977 | Schiess et al. | 30/310 |
| 4,397,593 | 8/1983 | Fordeck | 409/179 |
| 4,538,946 | 9/1985 | Bloch | 409/179 |
| 5,016,354 | 5/1991 | Baine | 83/745 |
| 5,065,517 | 11/1991 | Markes | 30/310 |
| 5,430,946 | 7/1995 | Peters et al. | 30/310 |
| 5,596,809 | 1/1997 | Beard | 30/310 |

*Primary Examiner*—Andrea L. Pitts
*Assistant Examiner*—Christopher Kirkman
*Attorney, Agent, or Firm*—Kenneth Jack

[57] ABSTRACT

A circular hole cutting apparatus comprising a support frame, having a forward end, a rearward end, a lower end, and an upper end; the forward end forming a cutting bit mounting means, capable of rotatably retaining a cutting bit so that the upper end of the cutting bit may upwardly extend from the upper end of the support frame, and so that the lower end of such a cutting bit may downwardly extend from the lower end of the support frame; and the lower end of the support frame forming a radius arm mounting means, the radius arm mounting means being capable of adjustably retaining a radius arm, so that the rearward end of the radius arm may alternately extend rearwardly from the rearward end of the support frame and retract forwardly from positions rearward of the rearward end of the support frame.

8 Claims, 4 Drawing Sheets

CIRCULAR HOLE CUTTER

FIELD OF THE INVENTION

The instant invention relates to handheld mechanical tools for cutting circular holes of varying sizes in substantially flat sheet material, such as sheet steel, sheet fiberglass, and plexiglass. In particular, the instant invention relates to circular hole cutting tools wherein the primary cutting element is a rotatably driven milling or cutting bit.

BACKGROUND OF THE INVENTION

Circular hole cutters such as the tool described in U.S. Pat. No. 3,146,675 issued Sep. 1, 1964, to Anderson utilize a side cutting milling bit rotatably driven by a source of rotational torque such as a portable electric drill, to cut a circular holes of varying sizes in materials such as sheet steel. The milling or cutting bit of such a tool is guided in a circular path about a radius point by a support frame which has mounted thereon in compass fashion the bit and the radius point. It is desireable that such circular hole cutters include an elongated support frame so that the radius point may be adjustably mounted along its length, allowing circular holes having a wide range of diameters to be cut by the hole cutter. It is also desireable that such a circular hole cutter have a control handle extending forwardly from its forward end to better control the tool as cutting progresses. However, any extension of the length of such a hole cutter introduces limitations on areas in which the hole cutter may be utilized. For example, where an elongated hole cutter has its radius point adjusted to allow the hole cutter to cut a small hole, the framework of the hole cutter extending rearward of the radius point may come into obstructive contact with nearby walls, pipes or other obstacles near the desired hole. Also, a handle element protruding forwardly from such a hole cutter may prevent the hole cutter from being utilized to cut holes in close proximity to an obstruction such as a wall or a ceiling. Thus, it is desireable to construct a circular hole cutter which may be configured as a long span, forward handle assisted, cutter for cutting large diameter holes with the assistance of a forward protruding handle, and alternately configured as a short span cutter having no forward handle, for cutting holes in tight spaces.

It is also often desireable to cut circular holes in stratified materials such as sound insulated sheet metal having a layer of sound insulating material underlying the sheet metal. A rotatably driven side cutting milling bit is ideally suited for cutting the top layer of sheet metal. However, a milling bit may be an inefficient means of cutting the underlying insulation. Typically, the cutting action of a knife blade is a better means of cutting such underlying insulation. Where such stratified material is to be cut by a rotatably driven milling bit guided in a circular path by a hole cutting tool, it is desireable that the tool provide for mounting of and simultaneous guiding of a cutting blade, such blade being capable of cutting at a depth deeper than and along the same circular path as the milling bit.

The instant inventive circular hole cutting tool provides the desireable trait of alternate long and short configurations, utilizing forward telescoping and retracting handle a rearward telescoping and retracting radius arm; and the desireable trait of a cutting blade mounting means for simultaneous blade cutting and milling bit cutting of stratified materials.

PRIOR ART PATENTS

U.S. Pat. No. 4,858,322 issued Aug. 22, 1989, to Kluga discloses a circular hole cutting device utilizing a cutting blade.

U.S. Pat. No. 4,782,703 issued Nov. 8, 1988, to Picone, et al., discloses a circular hole cutting device utilizing a cutting blade.

U.S. Pat. No. 4,602,434 issued Jul. 29, 1986, to Stradling discloses a circular hole cutting device utilizing a rotatably driven saw blade.

U.S. Pat. No. 3,934,343 issued Jan. 27, 1976, to Witecki discloses a circular hole cutting device utilizing a cutting blade.

Anderson (discussed above) discloses a circular hole cutting device utilizing a side cutting milling bit.

None of the above disclosed inventions teaches or describes the useful, unique and novel aspects and attributes of the present invention.

SUMMARY OF THE INVENTION

The instant inventive circular hole cutting tool comprises a rectangular frame member having an upper handle housing, a forward milling bit housing, and a lower radius arm housing. The upper handle housing comprises a hollow forward opening handle receiving channel having a telescoping handle mounted therein. The telescoping handle may be alternately retracted rearwardly to provide clearance from obstructions allowing hole cutting in tight spaces, or extended in telescoping fashion forwardly, providing a handle for enhanced manual control of the tool.

The tool's forward milling bit housing rotatably mounts and retains a side cutting milling bit so that the bit's upper end may protrude upwardly from the upper end of the hole cutter for attachment of the drill chuck of a portable electric drill, and so that the lower end of the milling bit may protrude downwardly from the lower end of the hole cutter for cutting engagement with material to be cut.

The lower radius arm housing end of the hole cutting tool comprises and open-ended and open-sided channel for slidably retaining and receiving a telescoping radius arm, the radius arm itself having an elongated channel therethrough for adjustably retaining and receiving a radius point. Through slidable positioning of the radius point and through telescoping extension or retraction of the radius arm, the overall effective length of the hole cutting tool may be alternately extended for cutting large diameter holes, and retracted, allowing cutting of smaller holes in tight spaces.

The instant inventive circular hole cutting tool further provides a blade mounting bracket in tangential alignment with the milling bit mounting, allowing the hole cutter to simultaneously perform milling bit cutting and blade cutting of stratified materials.

Thus, it is an object of the present invention to provide a circular hole cutting tool having a radius arm capable of alternate telescoping and retracting motion allowing the hole cutter to cut holes of a large diameter, and alternately be utilized for cutting smaller holes in tight spaces.

It is a further object of the present invention to provide a hole cutter having an alternately telescoping and retracting control handle providing for enhanced manual control of the tool while cutting progresses, and allowing for retraction of the handle when necessary for performing cutting in tight spaces.

It is a further object of the present invention to provide a hole cutter having both a rotatable milling bit mounting means and a cutting blade mounting means, allowing simultaneous milling bit cutting and blade cutting of stratified materials.

Other and further objects and advantages of the present invention will become apparent to those skilled in the art

3 upon review of the detailed description which follows, and upon review of the appended drawings.

DETAILED DESCRIPTION

Figure 1:
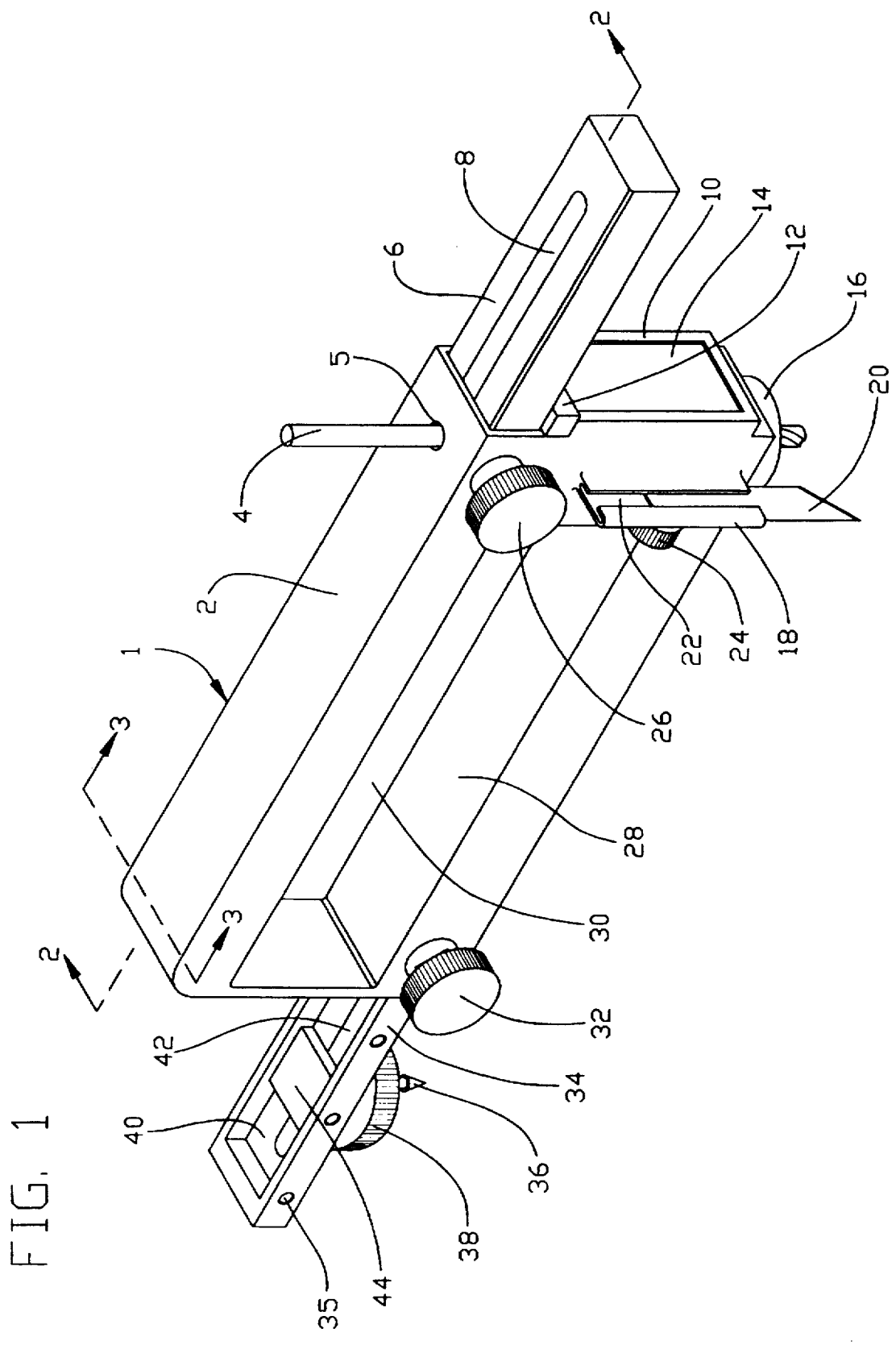
FIG. 1 is an isometric view of the instant inventive circular hole cutting tool.

Referring now to Drawing FIG. 1, the rectangular housing 1 provides for fixed mounting and rotatable motion of a milling bit 4. The rectangular housing 1 further provides a mounting menas for alternate telescoping and retracting motion of a control handle 6. The rectangular housing 1 further provides a mounting means for alternate telescoping and retracting motion of a cutting blade 20, the cutting blade being held in tangential alignment with the milling bit 4. The rectangular housing 1 further provides a mounting means for alternate telescoping and retracting motion of a radius arm 34.

Figure 2:
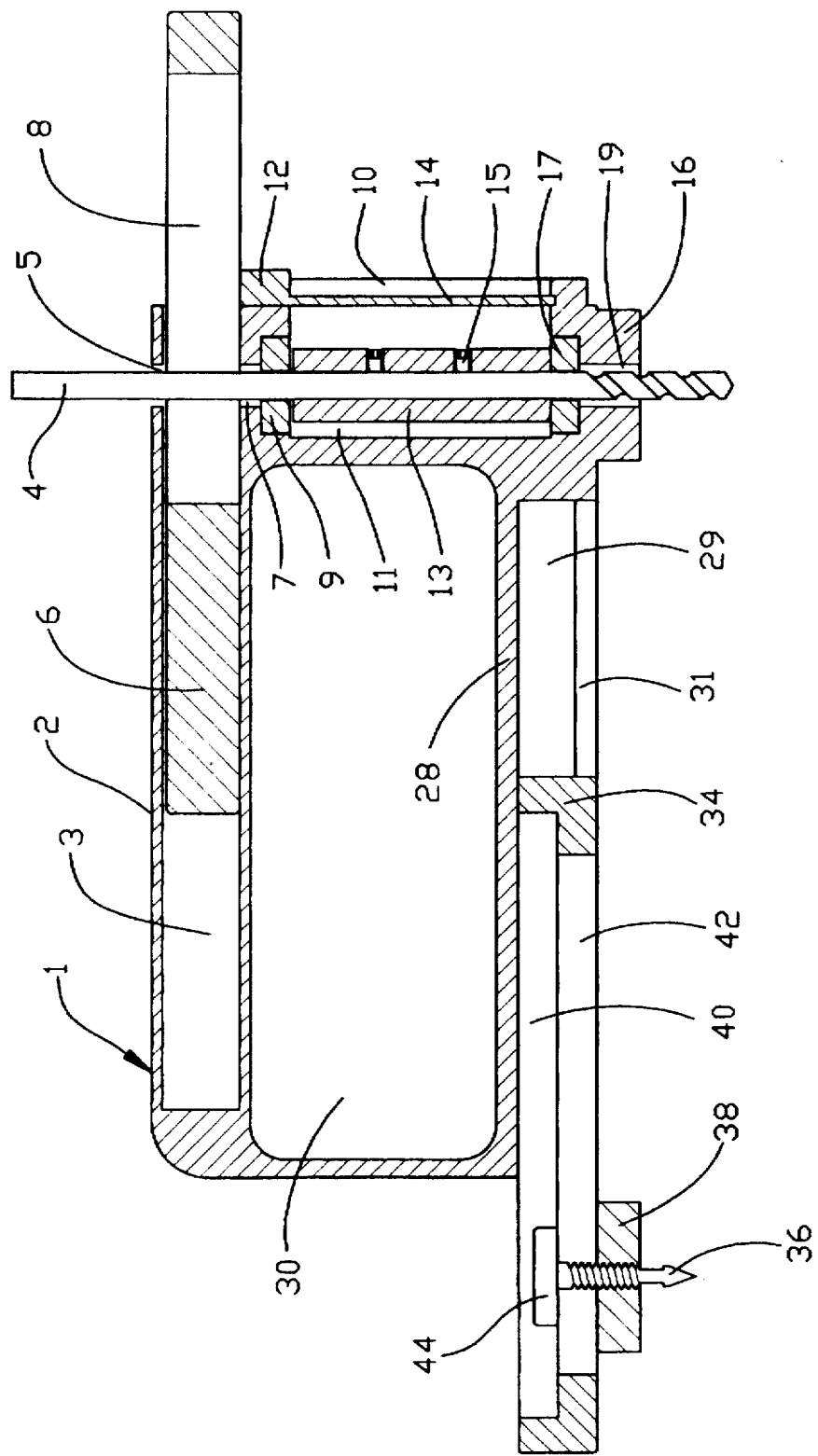
FIG. 2 is a longitudinal midline sectional view of the circular hole cutting tool with a midline mounted radius point and a midline mounted milling bit shown in external views.
Figure 4:
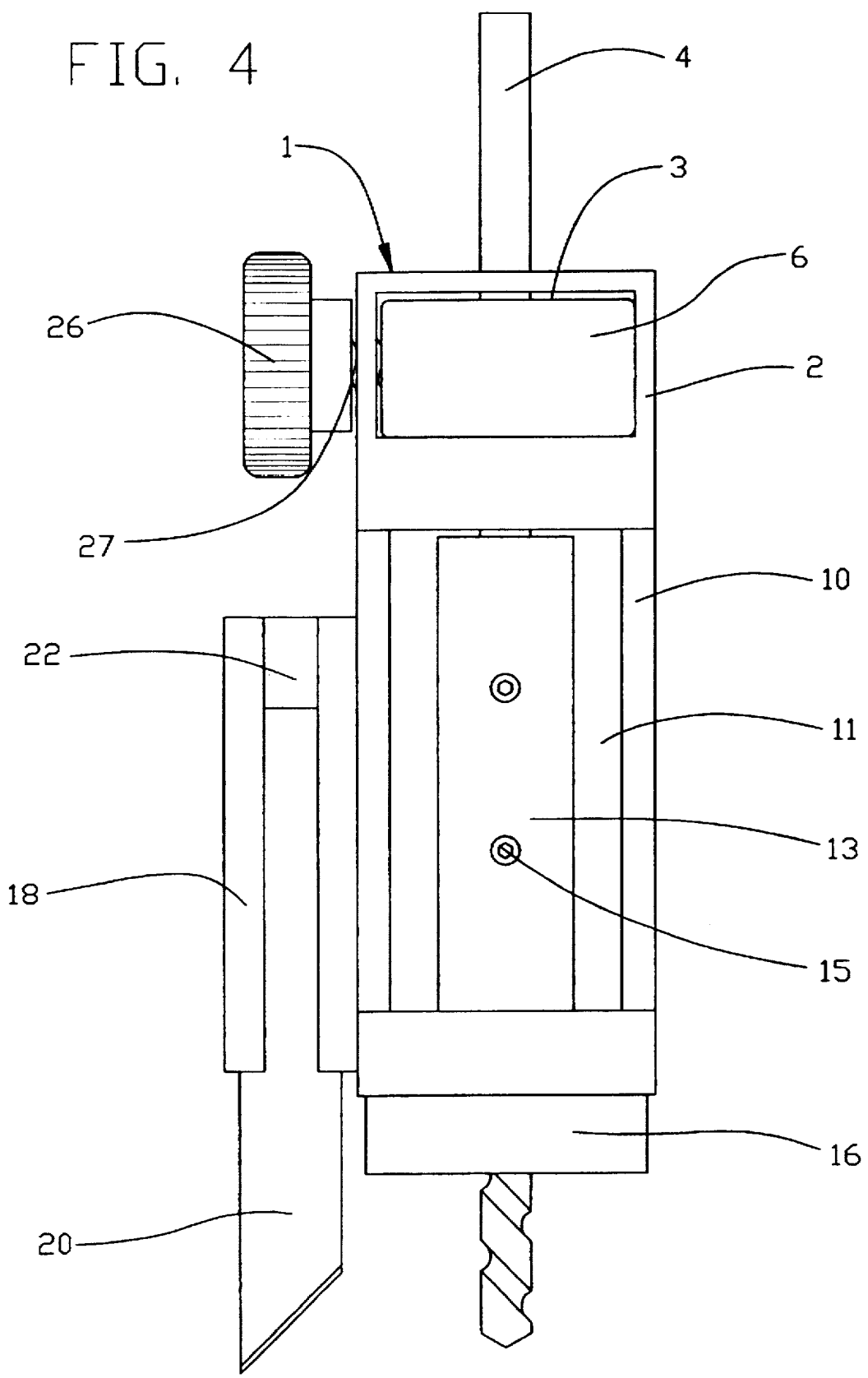
FIG. 4 is a front view of the circular hole cutting tool with bearing chamber cover plate removed.

Referring simultaneously to FIGS. 1 and 2, the control handle 6 is elongated, extending rearwardly into the handle housing 2 through a handle receiving channel 3. Referring to FIG. 4, a threaded handle set screw 27 passing through a threaded aperture in the sidewall of the rectangular housing 1 may alternately press against and holds in place the central handle 6, and release the control handle 6 through manual manipulation of the handle setscrew head 26.

Referring to FIG. 1, the handle setscrew head 26 may be manually turned counter-clockwise causing, referring to FIG. 4, the threaded setscrew 27 to withdraw from the sidewall of the control handle 6. Referring again to FIG. 1, the forward end of the control handle 6 may then be manually pressed rearwardly, causing the control handle 6 to slide rearwardly through, referring to FIG. 2, the handle receiving channel 3, with the milling bit 4 passing through a milling bit slot 8. Rearward slidable motion of the control handle 6 may continue until the forward end of the control handle 6 clears the upper end of a bearing chamber cover plate 14. Referring to FIG. 1, with the control handle 6 so rearwardly positioned, the handle setscrew head 26 may be manually turned counter-clockwise, causing, referring to FIG. 4, the threaded handle setscrew 27 to again press against the sidewall of the control handle 6, fixing the control handle 6 in its rearward position.

Referring simultaneously to FIGS. 1 and 2, and assuming that the control handle 6 is in its rearward retracted position, the thumb of an operator's hand may engage a thumb ridge 12 protruding from the upper end of the bearing chamber cover plate 14, pulling the bearing chamber cover plate 14 upward, and out of a cover plate retaining bracket 10. Referring to FIG. 4, upon removal of the bearing chamber cover plate 14, the bearing chamber 11 is exposed.

Referring to FIG. 2, the upper ceiling of the bearing chamber 11 is fitted to retain an upper ring bearing 9, and the floor of the bearing chamber 11 is fitted to retain a lower ring bearing 17. Upon slidable installation of the upper ring

4 bearing 9 and the lower ring bearing 17 within the upper and lower surfaces of the bearing chamber 11, a bit retaining sleeve 13 is inserted between the upper and lower ring bearings. Upon such positioning of the bit retaining sleeve 13, the milling bit 4 is downwardly inserted, first through an upper bit receiving aperture 5, thence through the milling bit slot 8 within the control handle 6, thence through a bearing chamber aperture 7, thence through the upper ring bearing 9, thence through the bit retaining sleeve 13, thence through the lower ring bearing 17, and thence through a lower bit receiving aperture 19 which centrally passes through a circular cutting base 16, and thence downwardly protruding from the lower end of the rectangular housing 1. Referring to FIG. 4, upon such insertion of the milling bit 4, the bit retaining sleeve 13 is rotated so that set screws 15 face forward. With the milling bit 4 and the bit retaining sleeve 13 so positioned, the bit retaining sleeve 13 may be securely affixed to the shaft of the milling bit 4 by tightening the set screws 15, the set screws 15 holding the entire bit mounting assembly in place. Upon such installation of the milling bit 4 within and through the rectangular housing 1 and within and through the bearing chamber 11, the bearing chamber cover plate 14 is slidably replaced for retention by the cover plate retaining bracket 10. Upon replacement of the bearing chamber cover plate 14, the bearing chamber 11 is closed, preventing dirt and cutting debris from fouling the bearing surfaces within the bearing chamber 11, and protecting the fingers of an operator's hands. Referring to FIG. 1, upon reinstallation of the bearing chamber cover plate 14, the handle setscrew head 26 may again be manipulated to release the control handle 6 and to affix the control handle 6 in its extended position. While the control handle 6 is in its extended position, its lower surface holds the bearing chamber cover plate 14 in its closed position.

Figure 3:
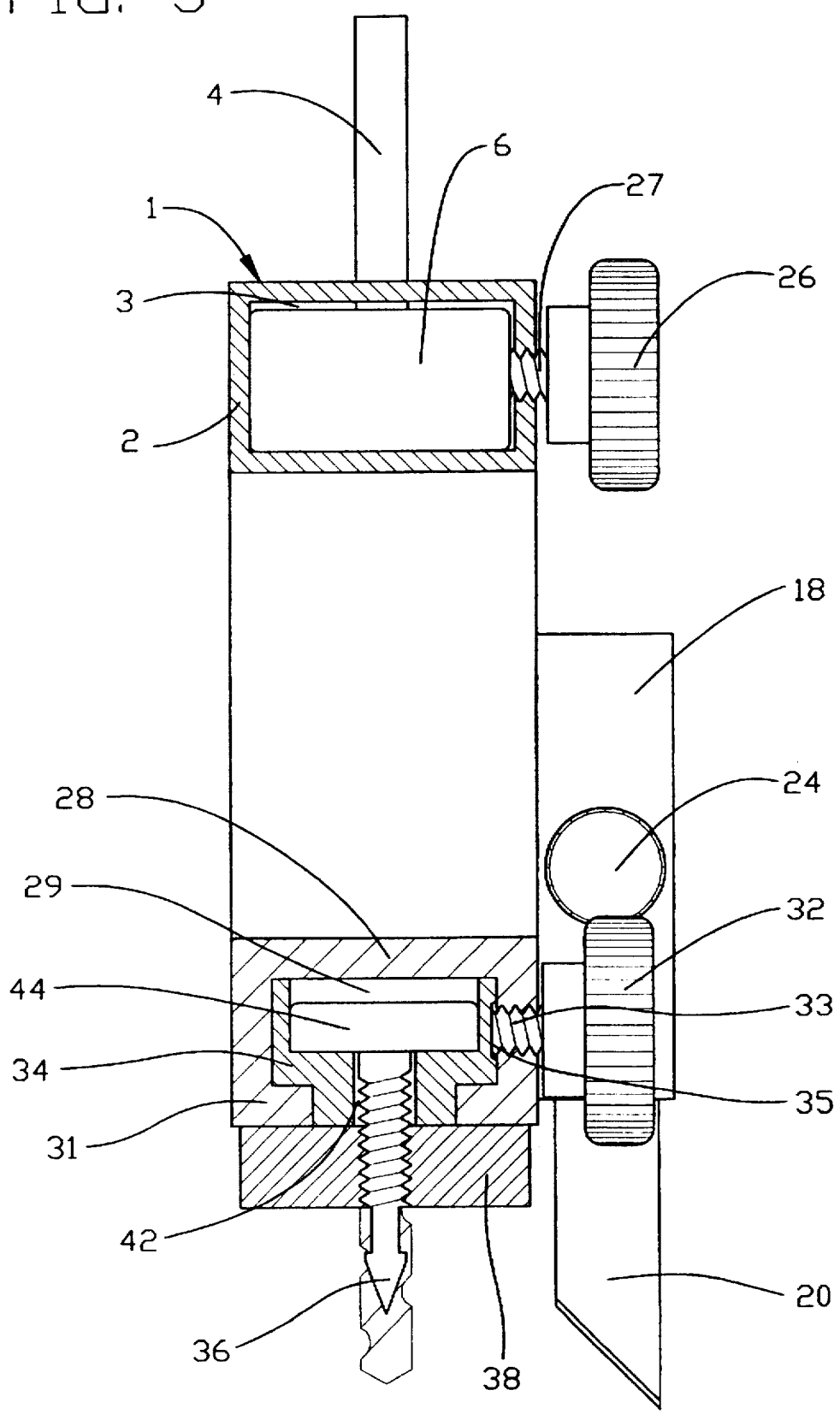
FIG. 3 is a sectional view of the circular hole cutting tool, the plane of the section passing laterally and vertically through the rear of the tool.

Referring to FIG. 1, a sidewall of the rectangular housing 1 forms a blade retaining bracket 18 having a vertically and tangentially aligned blade retaining channel 22; the blade retaining channel 22 being fitted for slidably receiving and retaining the cutting blade 20. Referring simultaneously to FIGS. 1 and 3, a blade set screw 24 may be manually manipulated to alternately tighten in place or release for repositioning the cutting blade 20. In operation of the tool, the cutting blade 20 may be extended downwardly to a depth below the lower end of the milling bit 4 for performing blade cutting of stratified layers of material underlying material to be cut by the milling bit 4.

Referring to FIG. 2, the radius arm 34 may be slidably positioned at a plurality of points along the length of a radius arm receiving channel 29, such channel 29 having, as indicated in FIGS. 2 and 3, an open lower side, and an open rearward end. Referring simultaneously to FIGS. 2 and 3, the lower edges 31 of the radius arm receiving channel 29 are underturned for slidably receiving and retaining the lower edge of the radius arm 34. Referring simultaneously to FIGS. 1 and 2, the radius arm 34 has an elongated radius point receiving slot 42 underlying an elongated radius point head guide channel 40. A square radius point head 44 is slidably placed within the radius point head guide channel 40, said channel 40 having, as indicated in Drawing FIG. 1, an open upper side, the opposing sidewalls of the radius point head 44 coming into slidable contact with the sidewalls of the radius point head guide channel 40. Downwardly extending from the lower surface of the radius point head 44 is a threaded radius point 36. Threadedly mounted over the threads of the radius point 36 is a radius point adjustment wheel 38. Upon manual tightening of the radius point adjustment wheel 38, the radius point 36 may be affixed at any longitudinal position along the radius point receiving slot 42. Upon manual loosening of the radius point adjustment wheel 38, the radius point 36 may be repositioned at any point along the radius point receiving slot 42.

Referring to FIG. 3, a radius arm set screw 33 extends through a threaded aperture in the sidewall of the rectangular housing 1 to alternately press against and release the sidewall of the radius arm 34. Referring simultaneously to FIGS. 1 and 3, the radius arm set screw head 32 may be manually turned counter-clockwise causing the radius arm set screw 33 to draw away from the sidewall of the radius arm 34, releasing the radius arm 34, and allowing slidable motion of the radius arm 34 along the radius arm receiving arm channel 29. Upon so releasing the radius arm 34, the radius arm 34 may be manually slidably moved inwardly or outwardly causing, referring to FIG. 1, a different set screw indentation 35 to come into alignment with, referring to FIG. 3, the end of the radius arm set screw 33. Upon such repositioning of the radius arm 34, the radius arm set screw 33 may be retightened through clockwise manipulation of the radius arm set screwhead 32. Upon tightening of the radius arm set screw 33 upon the radius arm 34 and within a set screw indentation 35, the radius arm 34 becomes securely affixed in its new position.

Referring simultaneously to FIGS. 1 and 2, the lower end of the radius arm 34 is flush with the lower end of the radius arm housing 28, while the lower end of a circular cutting base 16 lies in the same plane as the lower end of the radius point adjustment wheel 38.

Operation of the circular hole cutting tool allows circular holes to be cut in any sheet material amenable to cutting by a side cutting milling bit. Typically, sheet aluminum, sheet steel, or thin fiberboard may be cut by a milling bit. Referring to FIG. 1, in operation, a hole is punched or drilled in the material to be cut at the central point of the desired circular hole. The hole punched or drilled should be of sufficient size to receive the radius point 36. The radius arm setscrew head 32 and the radius point adjustment wheel 38 are then manipulated, allowing slidable positioning of the radius point 36 and the radius arm 34, so that the measured distance between the radius point 36 and the milling bit 4 is equal to the radius of the desired circular hole. Upon so positioning the radius point 36, the radius arm screw head 32 and the radius point adjustment wheel 38 are retightened, fixing in place the radius arm 34 and the radius point 36. Where the cutting environment permits, the control handle 6 is secured in its fully extended position through manipulation of the handle setscrew head 6.

In operation of the tool, the drill chuck of a portable electric drill is attached to the upper end of the milling bit 4, and the radius point 36 is placed into the prepunched or predrilled hole at the center of the desired circular hole. The portable drill is then operated to spin the milling bit 4, and the lower end of the milling bit 4 is then pressed downward, causing it to drill through the material to be cut. The portable drill and the cutting tool are then guided in a circular path about the radius point 36. After approximately one inch of cutting, the cutting blade 20 may be slidably extended downward into the slot cut by the milling bit 4 for cutting material such as insulation underlying the material to be cut by the milling bit 4. After extension of the cutting blade 20, cutting around a full circular arc may take place. In the event the control handle 6 comes into contact with an obstruction such as a support column or a plumbing pipe, the control handle 6 may be retracted until the tool swings past the obstruction. While the control handle 6 is retracted, the operator's hands hold the tool by grasping the portable drill and by grasping the handle housing 2 with the fingers of the operator's hands passing through the tool's central open space 30. After an obstruction is cleared, the control handle 6 may be re-extended for enhanced manual control.

As various possible embodiments might be made of the above disclosed invention, and as various changes might be made in the embodiment above set forth, it is to be understood that all matter herein set forth or shown in the accompanying drawings is to be interpreted as illustrative only, and not in a limiting sense.

We claim:

1. A circular hole cutting apparatus comprising:

a support frame having a forward end, a rearward end, a lower end, and an upper end; the forward end of the support frame forming cutting bit mounting means for rotatable retaining a material cutting bit and for positioning such bit so that an upper end of such bit extends from the upper end of the support frame, and so that a lower end of such bit extends from the lower end of the support frame; the lower end of the support frame forming radius arm mounting means adjustably retaining a radius arm for alternate rearward extension from and retraction to the rearward end of the support frame; the upper end of the support frame forming handle mounting means adjustably receiving and retaining an elongated handle, wherein said handle is alternately adjustably extendable to a point forward of the forward end of the support frame and retractable rearward from positions forward of the forward end of the support frame.

2. The circular hole cutting apparatus of claim No. 1, further comprising an elongated handle having a forward end, a rearward end, an upper end, a lower end, and a longitudinal midline extending from the handle's forward end to the handle's rearward end; and wherein the handle mounting means comprises an elongated open-ended channel having a longitudinal midline, the longitudinal midline of the elongated open-ended channel being substantially parallel with a line extending from the forward end of the support frame to the rearward end of the support frame, the elongated open-ended channel being fitted for slidably receiving and adjustably retaining the elongated handle, the elongated handle being slidably and adjustably mounted within the open-sided channel.

3. The circular hole cutting apparatus of claim No. 2, wherein the elongated handle overlies the cutting bit mounting means, and wherein the elongated handle has an aperture therethrough extending from its upper end to its lower end, the aperture being sized and positioned so that the upper end of a material cutting bit rotatably mounted upon the support frame by the cutting bit mounting means may upwardly extend through the aperture, the aperture being elongated along a line substantially parallel with a line extending from the forward end of the elongated handle to its rearward end.

4. The circular hole cutting apparatus of claim No. 3, further comprising a radius arm having a forward end, a rearward end, an upper end and a lower end, the radius arm being adjustably mounted upon the lower end of the support frame so that the rearward end of the radius arm is alternately extendable rearwardly from the rearward end of the support frame and retractable forwardly from positions rearward of the rearward end of the support frame.

5. The circular hole cutting apparatus of claim No. 4, further comprising a radius point having an upper end and a lower end, the radius point being mounted upon the radius arm so that the lower end of the radius point extends downwardly from the lower end of the radius arm.

6. The circular hole cutting apparatus of claim No. 5, wherein the radius point is further mounted upon the radius arm so that the radius point is adjustably and fixedly positionable at a plurality of positions along the longitudinal length of the radius arm.

7. The circular hole cutting apparatus of claim No. 6, wherein the radius arm mounting means comprises an elongated open-ended channel extending along the lower end of the support frame, the longitudinal midline of the elongated open-ended and open-sided channel being substantially parallel with a line extending from the forward end of the support frame to the rearward end of the support frame, the elongated open-ended channel being fitted for slidably receiving and retaining the radius arm.

8. The circular hole cutting apparatus of claim No. 7, wherein the radius arm forms an elongated channel, the longitudinal midline of the elongated channel being substantially parallel with a line extending from the forward end of the radius arm to the rearward end of the radius arm, the elongated channel being fitted for slidably and adjustably receiving and retaining the upper end of the radius point.

* * * * *